C. E. PIERCE.
TIRE TOOL.
APPLICATION FILED OCT. 5, 1916.

1,237,553.

Patented Aug. 21, 1917.
2 SHEETS—SHEET 1.

WITNESSES:
L. S. Woodhull
M. E. Broesamle

INVENTOR
Clyde E. Pierce.
BY
B. F. Wheeler
ATTORNEY

C. E. PIERCE.
TIRE TOOL.
APPLICATION FILED OCT. 5, 1916.

1,237,553.

Patented Aug. 21, 1917.
2 SHEETS—SHEET 2.

WITNESSES:
L. S. Woodhull
M. E. Broesamle

INVENTOR
Clyde E. Pierce
BY
B. F. Wheeler
ATTORNEY

UNITED STATES PATENT OFFICE.

CLYDE E. PIERCE, OF DETROIT, MICHIGAN.

TIRE-TOOL.

1,237,553.  Specification of Letters Patent.  Patented Aug. 21, 1917.

Application filed October 5, 1916. Serial No. 123,820.

*To all whom it may concern:*

Be it known that I, CLYDE E. PIERCE, a citizen of the United States, residing at Detroit, in the county of Wayne and State of Michigan, have invented a new and useful Tire-Tool, of which the following is a specification.

This invention relates to tire tools, especially adapted for use on vehicle tires of the clencher type, and it consists in the novel features of construction and operation as hereinafter set forth and claimed.

The invention has for its object the provision of a tool of simple and improved form for use in removing clencher tires from the rims of vehicle wheels, and especially for displacing the bead of the tire from the flange of the rim in the initial operation of applying the tool, in which the construction is such as to provide in conjunction with a spoke of the wheel a fulcrum bearing to afford leverage by which the bead of the tire may be shifted laterally from the flange of the rim to disengage it therefrom and permit the tool to be readily entered into position preparatory to the operation of plowing the tire from the rim of the wheel.

A preferred structural formation embodying the essential features of the present invention is illustrated in the accompanying drawings, in which:—

Figure 1:
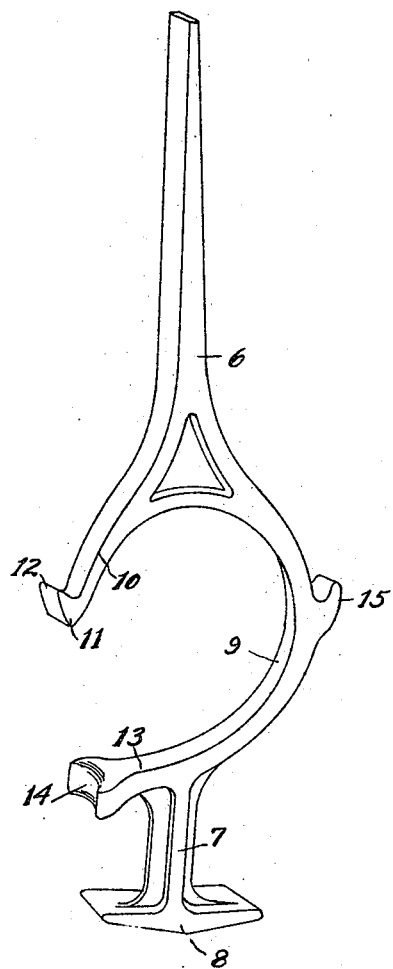
Figure 1 is a perspective view of the tool.

Referring to the parts of the device by the characters of reference marked on the drawings, 1 represents the wheel hub, 2 the spokes, and 3 the flanged rim with which the beads 4 of a common clencher tire casing 5 interlock in the usual way. The tool consists of a bar or lever 6 of suitable length to extend from the hub to a point beyond the tire of the wheel and is provided at one end with a base or shank 7 having a transverse bearing foot 8 adapted for engagement with the ground. The body portion 9 of the tool joining the lever 6 and shank 7 is deflected laterally in opposite directions in an enlarged arcuate or substantially C-shaped formation in which the lateral opening in one side thereof is of sufficient area to permit the tool to pass over and embrace the tire casing within the arcuate body portion. One of the prongs or branches 10 of the C-shaped body formation extends in the arc of said body from the lever 6 to a point substantially in transverse alinement with the axis of said arc and terminates in a tapered plow point 11 having an outwardly turned hook 12 thereon for engagement with the flange 3 of the rim. The other branch 13 of the arcuate body portion extends laterally from the inner end of the shank 7 to a point in alinement with the branch 10 in a plane substantially parallel with the lever of the tool and is provided in its outer end with a fork or concavity 14 adapted for engagement with a spoke of the wheel to afford a fulcrum bearing on which to swing the tool against the tire to displace the bead in the operation of inserting the plow point to effect the removal of the bead of the casing from the flange of the rim.

Figure 2:
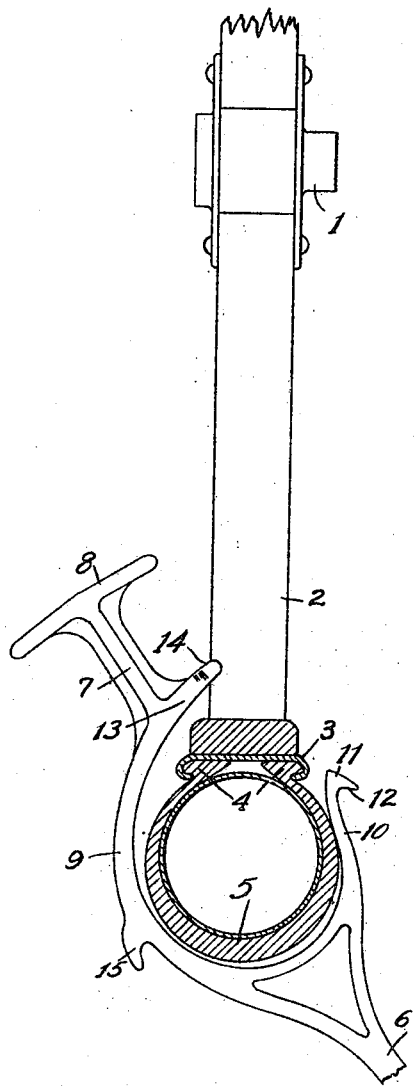
Fig. 2 is a sectional elevation of a portion of a wheel with tire, showing the tool thereon bearing upon a spoke of the wheel and engaging the tire in position for the initial operation of displacing the bead from the rim.
Figure 3:
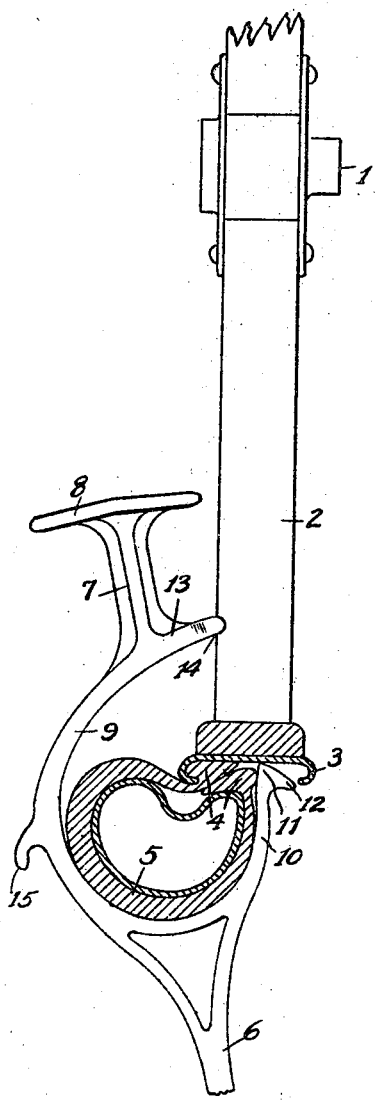
Fig. 3 is a view similar to Fig. 2, showing the tool in position at the completion of the operation for displacing the bead of the tire from the flange of the rim.
Figure 4:
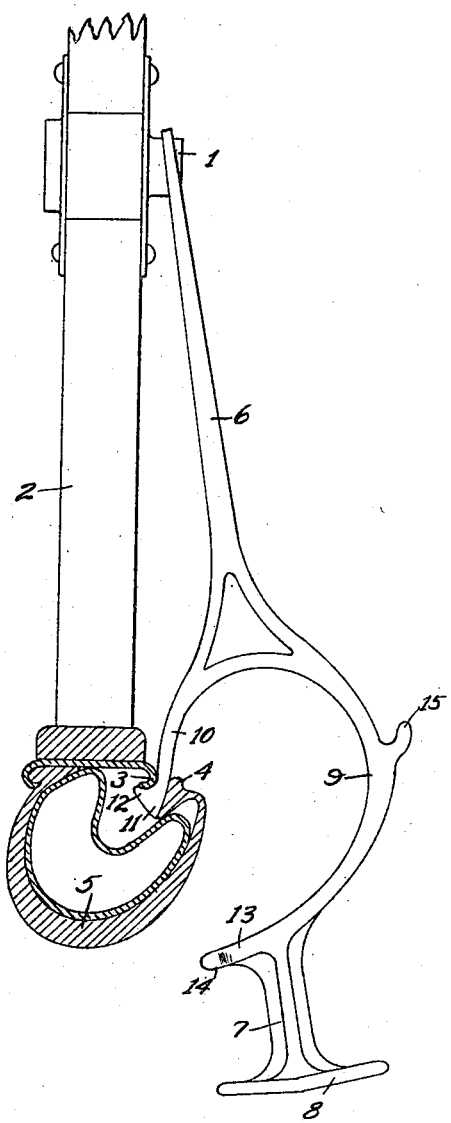
Fig. 4 is also a similar view showing the tool in the final position inserted between the flange of the rim and bead of the tire in engagement with the hub of the wheel, and adapted to engage the ground in the usual manner for plowing the tire from the rim.

The manner of applying and operating the tool in the removal of the tire casing from the rim of the wheel will now be understood as follows: As shown in Fig. 2, the tool is first placed over the tire with the inner face of the branch 10 engaging the tire casing at a point near the head on one side thereof and with the concaved bearing of the branch 13 engaging a spoke of the wheel upon the opposite side of the tire. The lever end of the tool is then swung upon its bearing with the spoke to the position shown in Fig. 3, in which position the branch 10 will have displaced and carried the head of the engaged side of the casing out of the flange transversely of the rim and the hook 12 will then be brought into adjacent opposed relation to the flange of the rim. By then applying pressure longitudinally on the tool simultaneously with the swinging of the lever in the reverse direction the plow point 11 will be brought into contact with the rim adjacent the bead, Upon further movement of the tool to the position shown in Fig. 4 with the lever engaged with the hub of the wheel, the hook 12 will pass into engagement with the flange of the rim and the plow point will be forced under the bead carrying it outwardly over the flange and interposing the branch 10 between the bead and flange in a manner to separate and retain the bead disengaged from the rim at that point. In this position the tool may be anchored by engaging the foot or bearing 8 with the ground, and by then rotating the wheel the branch being held in sliding contact with the rim by the hook 12 the bead will be deflected by the inner tapered face of the plow point and will be thrown entirely out of the rim upon the completion of a rotation of the wheel in a manner common in the operation of various tools for the removal of tires. A hook 15 is provided on the body 8 which may be employed to engage the bead and flange in the usual way for replacing the casing upon the rim.

In the use of tools generally for the removal of clencher tires, more or less difficulty is experienced owing to lack of provision for suitable leverage by which to displace the bead from the flange of the rim and permit the entrance of the plow of the tool preparatory to the removal of the tire, especially when the bead has become set by the presence of grit or dust in the flange of the rim as is frequently the case. This difficulty is effectively overcome in the present invention through the provision in conjunction with the hook and plow point of the arcuate body portion adapted to embrace the tire and having a branch or extension for engagement with a spoke of the wheel to afford a fulcrum bearing upon which to swing the tool against the tire and force the bead of the flange so as to enable the ready insertion of the plow point in the preparatory operation of applying the tool for the removal of the tire.

It is obvious that changes may be made in the details of the structural formation of the tool without departing from the essential features, and the invention is presented as including all such changes and modifications as properly come within the scope and meaning of the following claims.

I claim:—

1. A tire tool comprising a lever spread or branched at one end to form an enlarged arcuate portion having a lateral opening in one side thereof, said opening being of sufficient area to permit the entrance of a tire casing therethrough into said arcuate portion, one of the branches of said arcuate portion extending in the arc and plane therewith and adapted to engage the tire casing upon one side thereof, the other branch of said arcuate portion extending laterally therefrom and adapted to engage the spoke of a wheel and afford a fulcrum bearing upon which to swing said lever.

2. A tire tool comprising a lever spread or branched near one end to form an enlarged arcuate portion having a lateral opening between the branches thereof to permit the passage of a tire casing therethrough into said arcuate portion, one of said branches extending in the arc of the tire casing with which it is adapted to engage and terminating in an outwardly turned hook adapted to engage the rim of a wheel, the other of said branches terminating in a lateral extension adapted for engagement with the spoke of a wheel to provide a pivotal bearing on which to swing said lever and force said first named branch against said tire casing.

3. A tire tool comprising a lever spread or branched intermediate its ends to form an enlarged arcuate body portion having a lateral opening between the branches thereof, said opening adapted to permit the passage of a tire casing into said arcuate portion to be embraced transversely thereby, one of said branches extending to a point substantially in transverse alinement with the axis of said arcuate portion and adapted to engage the tire casing upon one side thereof, the other of said branches extending laterally to a point in alinement with said first named branch substantially parallel with said lever and having a concaved bearing in the end thereof for engagement with the spoke of a wheel upon the opposite side of said tire casing.

In testimony whereof, I sign this specification.

CLYDE E. PIERCE.

Copies of this patent may be obtained for five cents each, by addressing the "Commissioner of Patents, Washington, D. C."